Aug. 4, 1936.   S. SMITH   2,049,474
VEHICLE
Filed Oct. 12, 1933   4 Sheets-Sheet 1
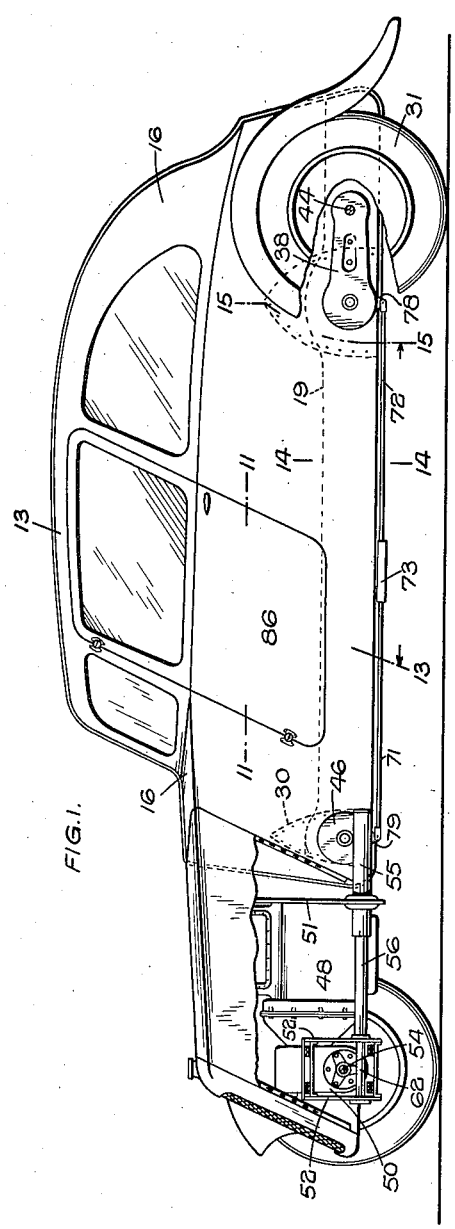
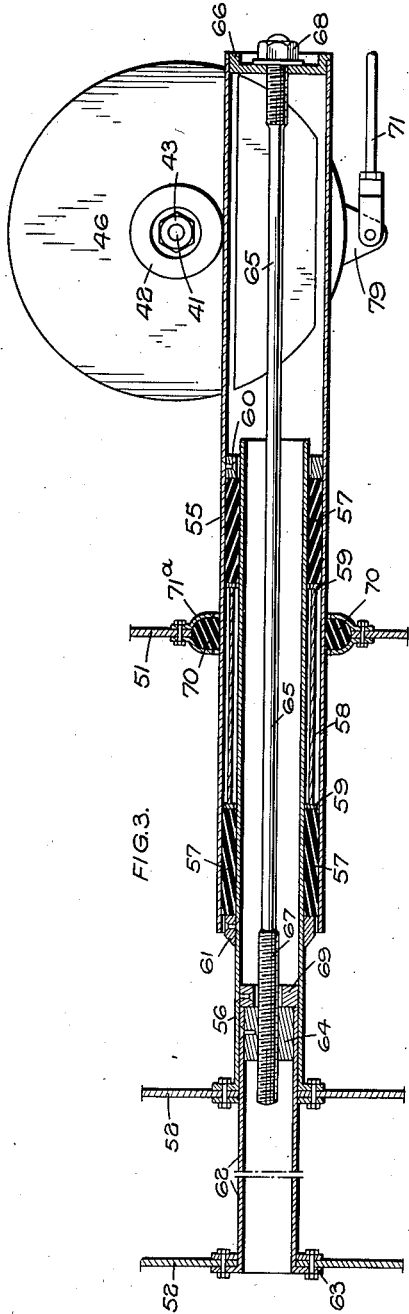
INVENTOR
SYDNEY SMITH
BY Francis E. Boyce
ATTORNEY Aug. 4, 1936.  S. SMITH  2,049,474
VEHICLE
Filed Oct. 12, 1933  4 Sheets-Sheet 2

INVENTOR
SYDNEY SMITH
BY Francis E. Boyce
ATTORNEY

Aug. 4, 1936.                S. SMITH                2,049,474
                              VEHICLE
                        Filed Oct. 12, 1933        4 Sheets-Sheet 3

INVENTOR
SYDNEY SMITH
BY Francis E. Boyce
ATTORNEY

Aug. 4, 1936.    S. SMITH    2,049,474
VEHICLE
Filed Oct. 12, 1933    4 Sheets-Sheet 4
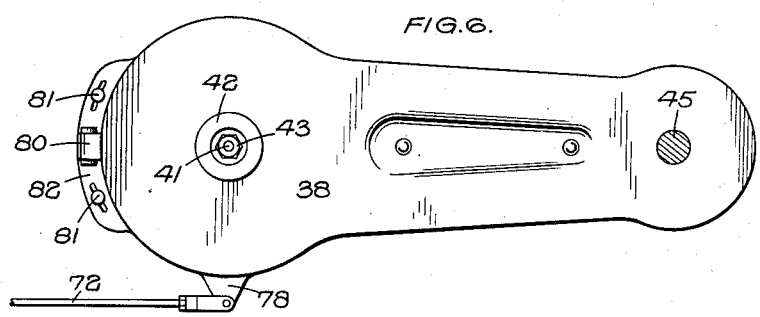
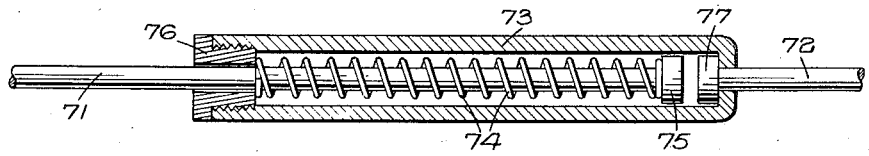
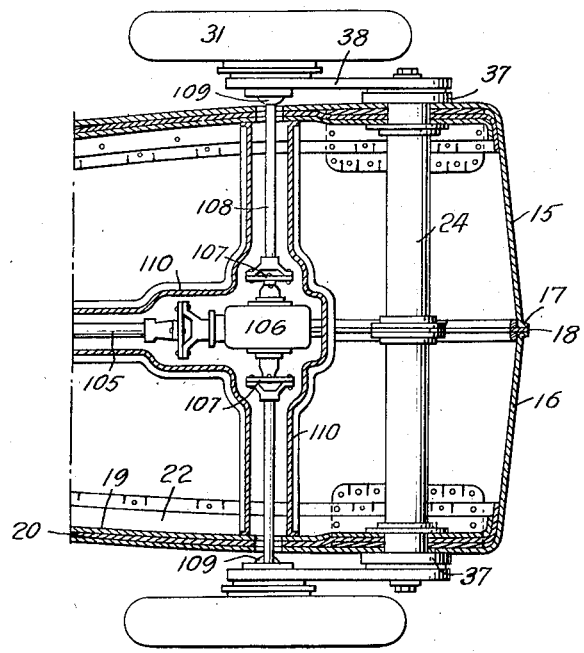
INVENTOR
SYDNEY SMITH
BY Francis E. Boyce
ATTORNEY Patented Aug. 4, 1936

2,049,474

UNITED STATES PATENT OFFICE 2,049,474

VEHICLE

Sydney Smith, Chobham, England

Application October 12, 1933, Serial No. 693,290
In Great Britain October 14, 1932

26 Claims. (Cl. 280—124)

This invention relates to improvements in vehicles, particularly automobile vehicles of the saloon type.

The primary object of the invention is to provide improved and simplified means for suspending the body of a vehicle from the road wheels.

Referring to the drawings:—

Figure 1 shows partly in section a vehicle constructed according to the present invention.

Figure 3 is a longitudinal section through one of the arms connecting the front wheel axle to the body.

Figure 6 shows in elevation the attachment arm for one of the rear wheel axles.

Figure 7 is a section of a further detail.

Figure 8 is a part sectional view of a modification.

Figure 2:
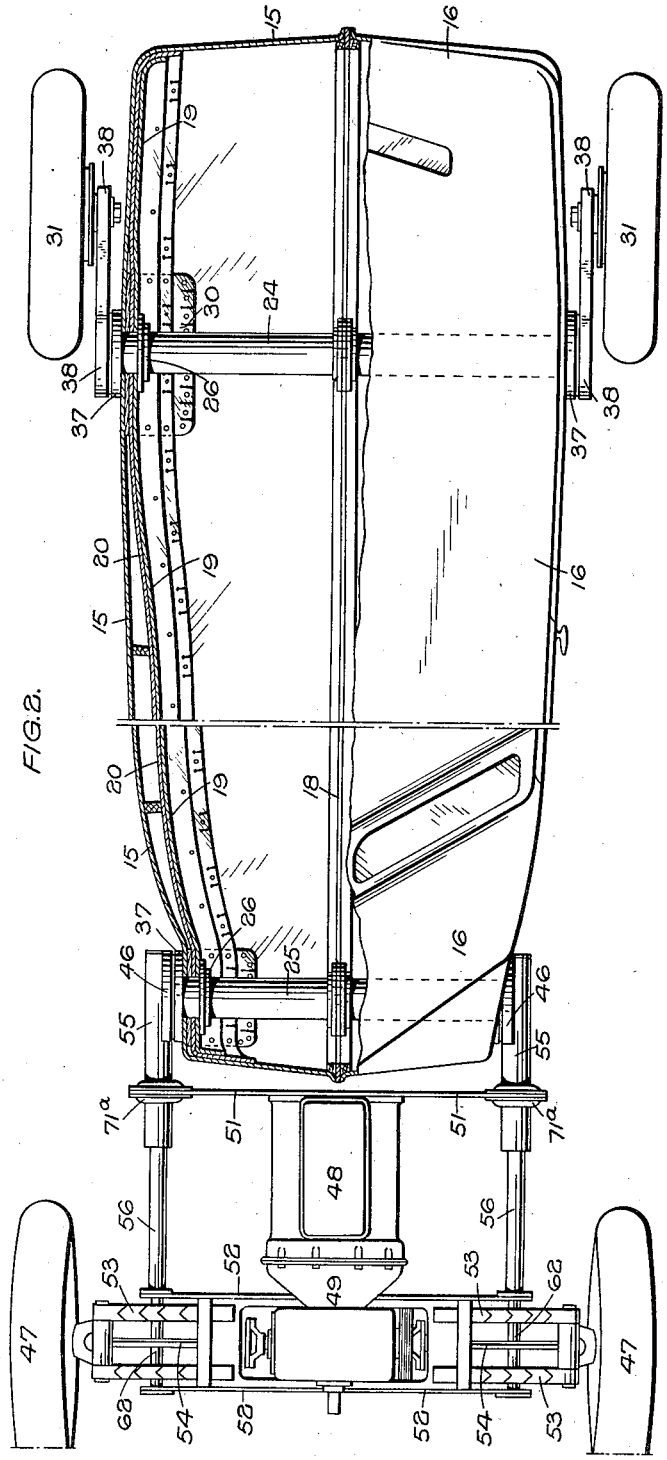
Figure 2 is a plan view of same partly in section and with the radiator engine cover removed.

In the application of this invention illustrated in Figures 1 to 7 of the drawings accompanying this specification, the body shell is constructed from two sheet metal pressings 15, 16 of similar shape but of opposite hand, each pressing being outwardly flanged at its peripheral edge as at 17, and the pressings being secured together to form the body shell.

The construction and reinforcement of the body shell form no part of the present invention but are covered in my co-pending application serially Numbered 715,859.

A transverse tube 24 is secured between the side walls of the body shell at the rear thereof, and a further transverse tube 25 is provided at the front of the body shell.

Each transverse tube is flanged at 26 adjacent each end, and these flanges and longitudinal reinforcement plates 19 and 20 are united to the side wall of the body by bolts 27 and 29.

The thickness of each flange 26 decreases towards its outer edge by forming each flange of two co-axial annular plates 26 and 28, which are secured to the tube by welding or a similar operation.

The body is suspended from the road wheels by means of india rubber springs each disposed between and bearing upon a pair of friction members, one of these members being secured to the body and the other carrying an arm associated with the axle for the road wheel or wheels.

Figure 4:
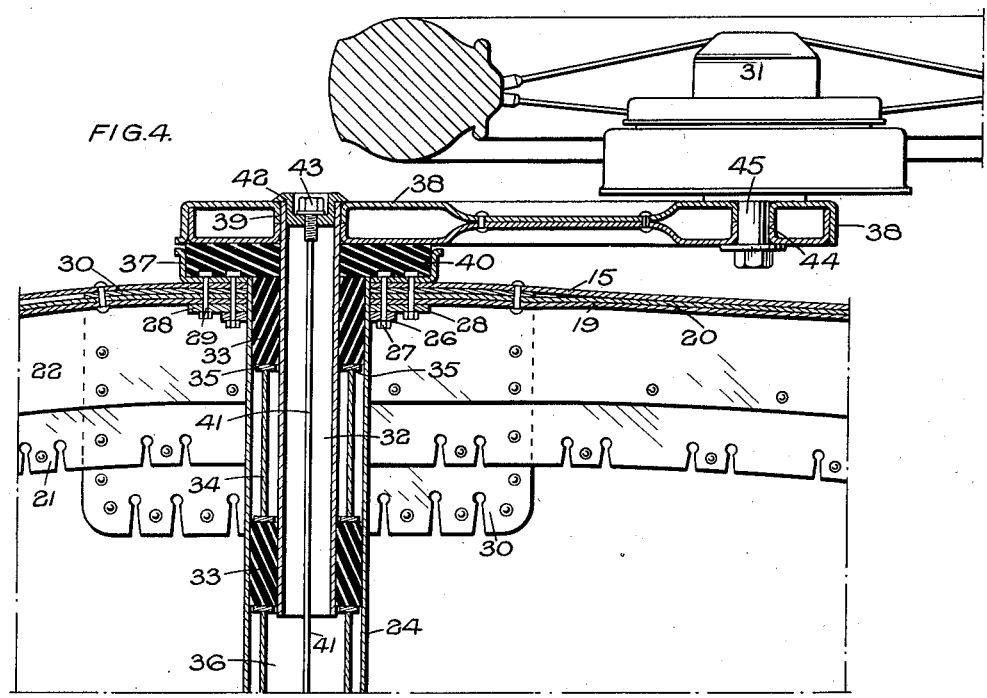
Figure 4 is a sectional view showing the construction of the springing of the rear wheels.
Figure 5:
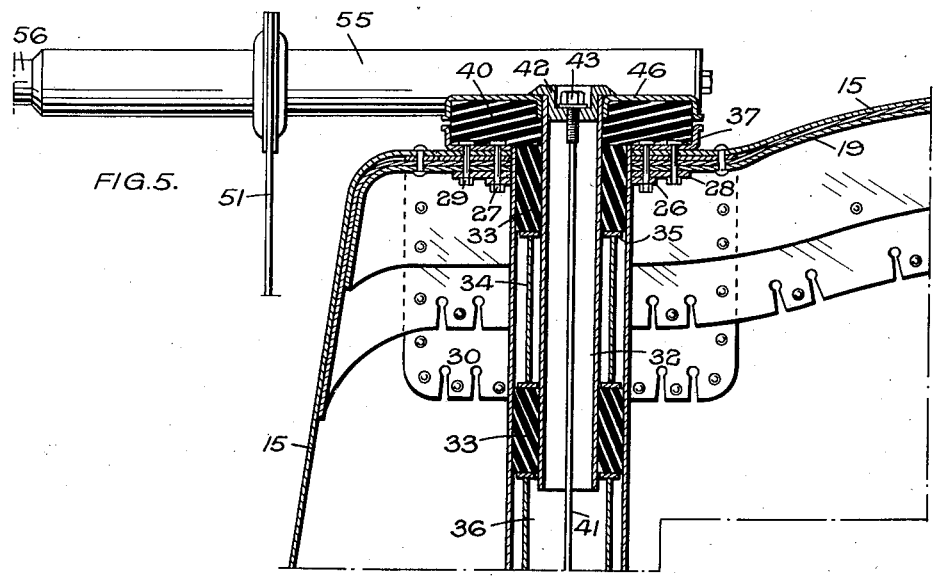
Figure 5 is a detail showing the attachment of the front wheel spring to the body shell.

In the construction applied to the rear wheels 31 of the vehicle an inner tube 32 is disposed within each end of the transverse tube 24, the ends of which latter are open and project through the reinforcement members and the side walls of the body as shown in Figure 4.

Each inner tube is spaced from the outer tube by means of two annular india rubber springs or bushes 33, spaced apart by means of a distance piece 34 and metal side rings 35. The rings 35 are formed with clearance both to the inner and outer tube to allow movement of the inner tube with respect to the outer tube. A further distance tube 36 extends between the inner spring 33 at one side of the vehicle and the inner spring at the opposite side.

At the exterior of the body and around the end of the outer tube 24 an annular flanged plate 37 is attached by the bolts 27 and 29, and to the outer end of each inner tube 32 is attached an arm 38.

Each arm 38 is formed from two shallow metal pressings riveted, and if desired welded together, and the arm is apertured at one end for rigid attachment to the end of the tube 32, each pressing being inwardly flanged at 39, and the end of the tube 32 being rigidly secured in this flanged aperture.

An annular india rubber block 40 is interposed between the flanged plate 37 and the inner face of the end of the arm 38, which latter is secured in position by means of a central bolt 41 extending entirely across the width of the body between end caps 42 inserted one into the outer end of each of the inner tubes 32.

By suitably tightening nuts 43 on the screw threaded ends of the bolts 41 the arms 38 can be secured in position, and the frictional pressure between the blocks 40 and the friction plates can be increased as desired.

In addition, tightening of the nuts 43 expands the annular rubber members 33 which are spaced apart by the distance tubes 34 and 36, and the frictional engagement between the members 33 and the inner and outer tubes 24 and 32 can be increased to the desired extent.

The central bolt 41 may constitute a torsion rod when the wheels act independently, and is therefore reduced in diameter intermediate the screw threaded ends upon which the nuts 43 are mounted.

At the free or projecting end of each arm 38 a further flanged aperture 44 is provided, and in this aperture is secured the end of an axle 45 upon which one of the rear road wheels 31 is mounted.

In the application to the front wheels of the vehicle, inner tubes 32, annular rubber springs 33, and distance tubes 34 and 36 are provided as described above, and a flanged friction plate 37 is secured to the exterior of the body.

A further flanged friction plate 46 is attached to the outer end of each inner tube 32, and the annular rubber block 40 inserted between these friction plates 37 and 46 is compressed into the desired frictional engagement therewith by means of a tie rod 41.

The invention is applied to a vehicle in which the engine drives to the front road wheels 47, and the engine, the supporting frame therefor, and the front wheel unit comprises a tractor unit behind which the vehicle body is drawn in the form of a trailer.

The engine 48, gear box 49 and differential casing 50 are supported on a rear engine plate 51, and a pair of front engine plates 52, and the front road wheels 47, supported by leaf spring 53 secured at their inner ends to the plates 52, are driven by drive shafts 54 suitably connected through universal joints to the differential gearing and to the road wheels.

The engine plates 51 and 52 are supported by a pair of arms secured one to each of the friction plates 46, and in order to allow a certain amount of turning movement about the longitudinal axes of these arms each of the latter is constructed in two parts telescoping one within the other.

Each arm comprises an outer tube 55 secured at one end to the friction plate 46 and open at the other end for the reception of one end of an inner tube 56 secured at its other end to the rearmost plate 52.

Between the tubes 55 and 56 are disposed annular rubber members 57 spaced apart by a distance tube 58 and loose rings 59, and confined between a ring 60 secured within the outer tube 55 and a further ring 61 secured around the inner tube 56.

A further short tube 62 flanged at one end 63 and bolted to the forward engine plate 52 projects rearwardly into the open end of the inner tube 56, and in the inner end of the tube 62 is secured a block 64 having an internally screw threaded hole therethrough.

A tie rod 65 extends between an end cap 66 at the rearward end of the outer tube 55 through the inner tube 56, and engages at its screw threaded end 67 in the block 64.

By adjusting a nut 68 at the end of the tie rod 65 the tubes 55 and 56 can be telescoped one within the other to expand the annular rubber members 57 radially into engagement with the interior of the tube 55 and the exterior of the tube 56.

The tubes 56 and 62 are prevented from telescoping by means of a collar 69 secured within the tube 56 to form an abutment for the inner end of the tube 62.

The engine plate 51 is carried by the outer tubes 55, annular rubber members 70 being provided between the plate and the tubes and being retained by flanged rings 71ᵃ bolted to the plate 51.

With this front wheel drive the power unit and the front wheels are practically isolated from the body, and any vibrations have to pass through the india rubber members interposed between the arms attached to the power unit and the body of the vehicle.

A spring controlled normalizing stay is connected between the arms 55 and 38 at each side of the body to return them quickly to a normal position, and to prevent these arms becoming displaced in use due to distortion of the rubber springs or to relative movement between the springs and the arms or the members secured thereto. Each normalizing stay is adjustable so that the normalizing effect can be varied; and increased loading on one or more wheels can be compensated for by increased tension in the spring controlled normalizing stay.

Each stay includes link rods 71 and 72 connected together by a housing 73 in which a spring 74 is housed, this spring being located on the end of the rod 71 between a flange 75 thereon and a plug 76 in one end of the housing.

A flange 77 on one end of the rod 72 engages the closed end of the housing, the rearward end of the rod 72 being adjustably connected to a lug 78 on the end of the arm 38, whilst the forward end of the rod 71 is connected with a corresponding lug 79 on the friction member 46.

In Figure 6 the arm 38 is provided with an abutment 80 located between stops 81 on a projecting flange 82 on the friction member 37, engagement of the abutment with one of the stops 81 limiting the movement of the arm 38.

With spring suspension of the form described the wheels are capable of movement practically independent of one another, and in addition the rubber spring members isolate the body from shocks which are absorbed in the springs themselves.

Since the spring members extend entirely around the connection between the wheel arms and the body shell thrusts in any direction are absorbed. Thus side thrusts due to centrifugal force of the rotating wheel, to the wheel striking an obstruction or to harsh braking of the wheel are transmitted to the rubber springs and are communicated as partially absorbed strains to the vehicle body.

The springs absorb both longitudinal and vertical components of a blow applied obliquely to the wheel, and since all forces likely to set up strains in the metal members are taken by the resilient springs, the wheel arms and other parts can be made lighter or of thinner gauge metal than would otherwise safely be possible.

The independency of the wheel mountings also reduces the danger of strains being communicated to the body due to inequalities of the road surface or unequal loading.

Since there is no metal to metal connection between the wheel arms and the body, and rubber springs are interposed at each point of connection, the springing of the vehicle and the riding comfort are increased.

Further, the wheel axles or arms are not damaged if the wheel receives a blow transverse of the length of the vehicle, such as if one wheel strikes the kerb stone in an inclined direction, since the wheel arms are resilient to a limited extent in such transverse direction and the rubber springs will absorb the shock whilst allowing slight movement of the wheel arm.

In the modified construction illustrated in Figure 8 the body is constructed as described above but the suspension between the body and the road wheels is modified to enable the drive to be transmitted to the rear road wheels 31.

The suspension for the wheels 31 is substantially as described with reference to Figures 1 to 7, including a transverse tube 24, arms 38, flanged plate 37 and rubber springs, but the tube 24 is arranged closer to the rear of the body and the arms 38 extend forwardly of the tube.

By this means the tube 24 does not interfere with the drive, which includes the usual drive shaft 105, differential gearing 106, universal joints 107 and transverse drive shafts 108. The shafts 108 drive the wheels 31 through a telescopic universal or ball joint 109 enabling slight alterations in the distance between the joints 107 and 109 with vertical movement of the wheel in use.

The drive shafts are enclosed in a suitable sheet metal casing 110 secured to the bottom of the body, and the side walls of the body are slotted to enable the shafts, mounted within the body, to communicate with the road wheels.

What I claim then is:—

1. A vehicle including a body, road wheels for said body, means for suspending said body from said wheels, a transversely extending tube at the front and rear of said body and at the lower portion thereof, a pivot member mounted in each open end of each transverse tube, annular rubber spring between said pivot member and outer tube, an arm on each of said pivot members, road wheel axles associated with said arms, and means for compressing said rubber springs in an axial direction and thereby expanding them radially into engagement with said pivot member and tube.

2. A vehicle including a body, road wheels for said body, means for suspending said body from said wheels, a transversely extending tube at the front and rear of said body and at the lower portion thereof, a pivot member mounted in each open end of each transverse tube, a plurality of rubber springs between each pivot member and the outer transverse tube in which it is mounted, distance members between said springs, an arm on each of said pivot members, road wheel axles associated with said arms, and means for compressing said rubber springs in an axial direction and thereby expanding them radially into engagement with said pivot member and tube.

3. A vehicle including a body, road wheels for said body, means for suspending said body from said wheels, a transversely extending tube at the front and rear of said body shell and at the lower portion thereof, an inner tube mounted in each open end of each transverse tube, a plurality of rubber springs between each inner tube and the outer transverse tube in which it is mounted, distance members between said springs, an arm on each of said inner tubes, road wheel axles associated with said arms, a flanged plate on each arm, a further flanged plate on said body at each end of each transverse tube, an annular rubber spring member between said flanged plates, and bolts for attaching said arms and for compressing said spring members to provide the desired engagement with the cooperating plates or members.

4. A vehicle including a body, road wheels for said body, means for suspending said body from said wheels, a transversely extending tube at the front and rear of said body shell and at the lower portion thereof, an inner tube mounted in each open end of each transverse tube, a plurality of rubber springs between each inner tube and the outer transverse tube in which it is mounted, distance members between said springs, an arm on each of said inner tubes, road wheel axles associated with said arms, a flanged plate on each arm, a further flanged plate on said body at each end of each transverse tube, an annular rubber spring member between said flanged plates, a tie rod extending through each of said transverse tubes and connecting the arms at the two ends of said tube, and means for adjusting said tie rod to secure said arms in position and to compress the spring members to provide the desired engagement with the cooperating plates or members.

5. An automobile vehicle including a body, road wheels for said body, means for suspending said body from said wheels, a transversely extending tube at the front and rear of said body shell and at the lower portion thereof, an inner tube mounted in each open end of each transverse tube, a plurality of rubber springs between each inner tube and the outer transverse tube in which it is mounted, distance members between said springs, an arm on each of said inner tubes, the arms associated with the forward transverse tube extending forwardly thereof, supporting plates secured between said forwardly extending arms, a power unit supported on said plates, drive shafts from said power unit to the front road wheels, and the arms associated with the rear transverse tube each carrying a stub axle for a rear road wheel.

6. An automobile vehicle including a body, road wheels for said body, means for suspending said body from said wheels, a transversely extending tube at the front and rear of said body shell and at the lower portion thereof, an inner tube mounted in each open end of each transverse tube, a plurality of rubber springs between each inner tube and the outer transverse tube in which it is mounted, distance members between said springs, an arm on each of said inner tubes, the arms associated with the forward transverse tube extending forwardly thereof, supporting plates secured between said forwardly extending arms, a power unit supported on said plates, drive shafts from said power unit to the front road wheels, and the arms associated with the rear transverse tube, each engaging at its forward end with one of said inner tubes and carrying at its rearward end an outwardly projecting stub axle for one of the rear road wheels.

7. An automobile vehicle including a body, road wheels for said body, means for suspending said body from said wheels, a transversely extending tube at the front and rear of said body shell and at the lower portion thereof, longitudinally extending reinforcement plates for said body shell, each of said plates being secured between the interior of said body and flanges on said transverse tubes, and being secured at its lower horizontal edge to said body shell, an inner tube mounted in each open end of each transverse tube, a plurality of rubber springs between each inner tube and the outer transverse tube in which it is mounted, distance members between said springs, an arm on each of said inner tubes, the arms associated with the forward transverse tube extending forwardly thereof, supporting plates secured between said forwardly extending arms, a power unit supported on said plates, drive shafts from said power unit to the front road wheels, and the arms associated with the rear transverse tube each carrying a stub axle for a rear road wheel.

8. An automobile vehicle including a body, road wheels for said body, means for suspending said body from said wheels, a transversely extending tube at the front and rear of said body shell and at the lower portion thereof, an inner tube mounted in each open end of each transverse tube, a plurality of rubber springs between each inner tube and the outer transverse tube in which it is mounted, distance members between said springs, an arm on each of said inner tubes, a flanged plate on each arm, a further flanged plate on said body at each end of each transverse tube, an annular rubber spring member between said flanged plates, a tie rod extending through each of said transverse tubes, and connecting the arms at the two ends of said tube, means for adjusting said tie rod to secure said arms in position and to compress the spring members to provide the desired engagement with the cooperating plates or members, the arms associated with the forward transverse tube extending forwardly thereof, supporting plates secured between said forwardly extending arms, a power unit supported on said plates, drive shafts from said power unit to the front road wheels and the arms associated with the rear transverse tube each carrying a stub axle for a rear road wheel.

9. A frameless motor vehicle of the saloon type having a body shell including a pair of opposed sheet metal pressings of similar shape but of opposite hand, means for connecting said pressing together to form said body shell, road wheels for said body, means for suspending said body from said wheels, a transversely extending tube at the front and rear of said body shell and at the lower portion thereof, longitudinally extending reinforcement plates for said body shell, each of said plates being secured between the interior of said body and flanges on said transverse tubes, and being secured at its lower horizontal edge to said body shell, an inner tube mounted in each open end of each transverse tube, a plurality of rubber springs between each inner tube and the outer transverse tube in which it is mounted, distance members between said springs, an arm on each of said inner tubes, the arms associated with the forward transverse tube extending forwardly thereof, supporting plates secured between said forwardly extending arms, a power unit supported on said plates, drive shafts from said power unit to the front road wheels, and the arms associated with the rear transverse tube each carrying a stub axle for a rear road wheel.

10. In a vehicle the provision of spring suspension for the road wheels including arms each associated at one end with a road wheel axle, a pivot member at the other end of the arm, a tubular member carried by the vehicle, said pivot member projecting perpendicularly from said arm and engaging in said tubular member, a rubber spring between said pivot member and said tubular member, a flanged plate at the end of said tubular member, a rubber spring between the end of said arm and said flanged plate, and means for compressing said rubber springs to provide the desired engagement between the wheel arm and the pivot therefor on the one side and the tubular member and flanged plate on the other side.

11. In a vehicle the provision of spring suspension for the road wheels including arms each associated at one end with a road wheel axle, a flanged plate at the other end of the arm, a tubular member secured to said vehicle, a pivot member projecting laterally from said flanged plate, and engaging in said tubular member, a rubber spring between said pivot member and said tubular member, a further flanged plate at the end of said tubular member, a rubber spring between said flanged plates, and means for compressing said rubber springs to provide the desired engagement between the wheel arm and the pivot therefor on the one side and the tubular member and flanged plate on the other side.

12. In a vehicle the provision of spring suspension for the road wheels including arms each associated at one end with a road wheel axle, a flanged plate at the other end of the arm, a tubular member secured to said vehicle, a pivot member projecting laterally from said flanged plate and engaging in said tubular member, a rubber spring between said pivot member and said tubular member, a further flanged plate at the end of said tubular member, a rubber spring between said flanged plates, and a tie rod for moving said pivot and the wheel arm longitudinally of said tubular member to compress the said rubber springs and provide the desired engagement between the wheel arm and the pivot therefor on the one side and the tubular member and flanged plate on the other side.

13. In a vehicle the construction of a body, tubular members carried by said body and a partial drum-like member associated therewith, road wheels for said body, means for attaching said road wheels to the body comprising in combination arms each carrying a road wheel at one end and a partial drum-like member, and laterally projecting pivot members at the other end, rubber members located between said partial drum-like members on the body and wheel arm, and between the lateral projections on the drum and the tubular members on the body.

14. A vehicle including a body, road wheels for said body, means for suspending said body from said wheels, said means including arms for said wheels, wheel axles associated with said arms, a rubber disc of large diameter between each of said wheel arms and said body, a pivot member for each of said wheel arms, a rubber member of smaller diameter between said pivot member and said body, said rubber discs and rubber members acting in torsion to resist movement of said wheel arms relative to said body and means for adjusting the torsional resistance offered by said discs and said members.

15. A vehicle including a body, road wheels for said body, means for suspending said body from said wheels, said means including arms for said wheels, wheel axles associated with said arms, a rubber disc of large diameter between each of said wheel arms and said body, a pivot member for each of said wheel arms, a rubber member of smaller diameter between said pivot member and said body, said rubber discs and rubber members acting in torsion to resist movement of said wheel arms relative to said body and means for collectively compressing the rubber members for each of said wheel arms so as to increase collectively the resistance to distortion.

16. A vehicle including a body, road wheels for said body, means for suspending said body from said wheels, said means including arms for said wheels, wheel axles associated with said arms, a pivot member for each of said wheel arms, a plurality of rubber members between said pivot members and said body, rigid spacing members between said rubber members, said rubber members and said spacing members extending entirely across the width of said body at the front and rear thereof and means for collectively compressing all the rubber members at each end of said body so as to increase collectively the resistance to distortion.

17. A vehicle including a body, road wheels for said body, means for suspending said body from said wheels, said means including arms for said wheels, wheel axles associated with said arms, a pivot member for each of said wheel arms, a plurality of rubber members between said pivot members and said body, rigid spacing members between said rubber members, said rubber members and said spacing members extending entirely across the width of said body at the front and rear thereof and means for collectively compressing the rubber members for each of said wheel arms so as to increase collectively the resistance to distortion.

18. A vehicle including a body, road wheels for said body, means for suspending said body from said wheels, said means including arms for said wheels, wheel axles associated with said arms, a torsion rubber disc between each of said wheel arms and the outside of said body, a pivot member for each of said wheel arms, a further rubber member between said pivot member and said body and said rubber discs and rubber members acting in torsion to resist movements of said wheel arms relative to said body.

19. A vehicle including a body, road wheels for said body, means for suspending said body from said wheels, said means including arms for said wheels, wheel axles associated with said arms, a rubber disc of large diameter between each of said wheel arms and the outside of said body, a pivot member for each of said wheel arms, a rubber member of smaller diameter between said pivot member and said body, said rubber discs and rubber members acting in torsion to resist movements of said wheel arms relative to said body and means for collectively compressing the rubber disc and rubber member for each wheel arm so as to increase collectively the resistance to distortion.

20. A vehicle including a body, road wheels for said body, means for suspending said body from said wheels, said means including a forward wheel arm at each side of said body, a rearward wheel arm at each side of said body, wheel axles associated with said arms, a pivot member for each of said wheel arms, a plurality of rubber members between said pivot members and said body, means for adjusting the compression on said rubber members to adjust the resistance to movement of said wheel arms, a longitudinally extending stay at each side of said body, each stay connecting the forward and rearward wheel arms at one side of said body, and a resilient connection in each stay allowing movement of said wheel arms.

21. A vehicle including a body, road wheels for said body, means for suspending said body from said wheels, said means including a forward wheel arm at each side of said body, a rearward wheel arm at each side of said body, wheel axles associated with said arms, a rubber disc of large diameter between each of said wheel arms and said body, a pivot member for each of said wheel arms, a rubber member of smaller diameter between said pivot member and said body, said rubber discs and rubber members acting in torsion to resist movements of said wheel arms relative to said body, means for adjusting the torsional resistance offered by said discs and said members, a longitudinally extending stay at each side of said body, each stay connecting the forward and rearward wheel arms at one side of said body, and a spring connection in each stay permitting movement of said wheel arms.

22. In a vehicle the combination of a body, tubular members carried by said body, a partial drum-like member on said body at the end of each of said tubular members, road wheels for said body, means for attaching said road wheels to said body comprising in combination a forward wheel arm at each side of said body, a rearward wheel arm at each side of said body, each of said arms carrying a road wheel at one end and at the other end a partial drum-like member and a laterally projecting pivot member, rubber members located between said partial-drum-like members on the body and on the wheel arms and between the pivot members and the tubular members on the body, a longitudinally extending stay at each side of said body, each stay connecting the forward and rearward wheel arms at one side of said body and a spring connection in each stay permitting movement of said wheel arms.

23. In a vehicle the combination of a body; road wheels; wheel carrying arms; rubber members disposed between the said wheel carrying arms and the body and adapted to support the body by torsional resilience; means for compressing said rubber members; a stay incorporating a spring member and connecting the wheel arms on each side of the vehicle; so arranged that the body is resiliently and collectively supported by the rubber members and by the said stay and its spring.

24. In a vehicle the combination of a body; road wheels; wheel carrying arms; rubber members disposed between the said wheel carrying arms and the body and adapted to support the body by torsional resilience; means for compressing said rubber members; a stay incorporating a spring member connected to a wheel arm and to the vehicle; so arranged that the body is resiliently and collectively supported by the rubber members and by the said stay and its spring.

25. A vehicle including a body, road wheels for said body, means for suspending said body from said wheels, said means including a forward wheel arm at each side of said body, a rearward wheel arm at each side of said body, wheel axles associated with said arms, a pivot member for each of said wheel arms, rubber members between said wheel arms and said body, and between said pivot members and said body, means for adjusting the torsional resistance offered by said discs and said members, said forward wheel arms each comprising two parts telescopically mounted one upon the other, further rubber members between said parts, and means for adjusting the pressure on said further rubber members.

26. A vehicle including a body, road wheels for said body, means for suspending said body from said wheels, said means including a forward wheel arm at each side of said body, a rearward wheel arm at each side of said body, wheel axles associated with said arms, a rubber disc of large diameter between each of said wheel arms and said body, a pivot member for each of said wheel arms, a rubber member of smaller diameter between said pivot member and said body, said rubber discs and rubber members acting in torsion to resist movements of said wheel arms relative to said body, means for collectively compressing the rubber disc and rubber member for each wheel arm so as to increase collectively the resistance to distortion, said forward wheel arms each comprising two parts telescopically mounted one upon the other, further rubber members between said parts, means for collectively compressing said further rubber members, a power unit supported on said forward wheel arms, and drive shafts from said power unit to the front road wheels.

SYDNEY SMITH.